(12) United States Patent
Li et al.

(10) Patent No.: US 11,966,585 B2
(45) Date of Patent: Apr. 23, 2024

(54) STORAGE DEVICE AND STORAGE SYSTEM

(71) Applicant: INNOGRIT TECHNOLOGIES CO., LTD., Shanghai (CN)

(72) Inventors: Tianren Li, Shanghai (CN); Gang Hu, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 27 days.

(21) Appl. No.: 17/975,816

(22) Filed: Oct. 28, 2022

(65) Prior Publication Data
US 2023/0137668 A1 May 4, 2023

(30) Foreign Application Priority Data
Oct. 28, 2021 (CN) .......................... 202111265593.0

(51) Int. Cl.
*G06F 12/00* (2006.01)
*G06F 3/06* (2006.01)

(52) U.S. Cl.
CPC .......... *G06F 3/0611* (2013.01); *G06F 3/0656* (2013.01); *G06F 3/0659* (2013.01); *G06F 3/0679* (2013.01)

(58) Field of Classification Search
CPC .... G06F 3/0611; G06F 3/0656; G06F 3/0659; G06F 3/0679
See application file for complete search history.

(56) References Cited

U.S. PATENT DOCUMENTS 9,811,263 B1 * 11/2017 Teh ........................ G06F 3/0656

* cited by examiner

*Primary Examiner* — Shawn X Gu
(74) *Attorney, Agent, or Firm* — WOMBLE BOND DICKINSON (US) LLP

(57) ABSTRACT

The present disclosure relates to a storage device and a storage system. The device comprises a storage, a storage controller, a control module, and a buffer module. The control module is configured to: when receiving a data read-write instruction, update the data read-write instruction by using a virtual address; apply for K buffer units in the buffer module; perform a write operation on the K buffer units by using data to be read and written; and when any of the K buffer units is full, directly start data transmission of the full buffer unit. By using the virtual storage address and by employing data block management, the present disclosure can update and forward an NVMe I/O command without applying for a storage space in advance, and can start data block transmission without checking the completion message.

12 Claims, 5 Drawing Sheets

STORAGE DEVICE AND STORAGE SYSTEM

CROSS-REFERENCE TO RELATED APPLICATION

This patent application claims priority, under 35 U.S.C. § 119, of Chinese Patent Application No. 202111265593.0, filed Oct. 28, 2021, which is incorporated by reference in its entirety.

TECHNICAL FIELD

The present disclosure relates to the technical field of storage, in particular to a storage device and a storage system.

BACKGROUND

With the improvement of PCIe performance and the decrease of the cost of solid-state disk cells, the NVMe (Non-Volatile Memory express) standard based on the PCIe architecture has been becoming mainstream in the consumer market. Nowadays, more and more enterprises expect to use hard disks based on the NVMe standard in data centers and enterprises. However, due to the huge amount of data in data centers and the demands for flexible access and remote access of multiple hosts, the standard of NVMe over Fabric has been introduced in the industry, which allows the NVMe protocol to run on network protocols including Ethernet, Fiber Channel network, etc., thus expanding the flexibility of the NVMe protocol.

According to related technical solutions, in order to ensure efficient transmission performance, the storage server needs a huge memory space. Moreover, completion latency of read or write commands is high in related technologies, and if the storage server uses a processor to complete command conversion and interrupt processing, the utilization rate of the processor will be very high.

SUMMARY

According to an aspect of the present disclosure, a storage device is provided, which is applied to a storage server based on the NVMe over Fabric architecture. The storage device comprises a memory, a storage controller, a control module, and a buffer module, wherein the memory is configured to store data to be read and written by a host in the architecture, the storage controller is configured to effect read-write (read and/or write) control of the memory, the control module is configured to receive data read-write instructions, and the buffer module is divided into a plurality of buffer units, wherein the control module is configured to:
  when receiving a data read-write instruction, update the data read-write instruction by using a virtual address;
  apply for K buffer units in the buffer module based on the updated data read-write instruction, and perform a write operation on the K buffer units by using the data to be read and written, wherein K is less than a total number of the buffer units in the buffer module and is an integer; and
  when any of the K buffer units is full, directly start data transmission of the full buffer unit, and when the data transmission is completed, release the full buffer unit.

In a possible implementation, the control module is further configured to:
  establish a mapping relationship between the virtual address and the buffer units; and
  when data transmission of a full buffer unit is completed, cancel the mapping relationship between the virtual address and the full buffer unit.

In a possible implementation, the updating of the data read-write instruction by using the virtual address comprises: replacing a memory address of the host in a data pointer in the data read-write instruction with the virtual address; and
  the control module is further configured to establish a mapping relationship between the virtual address and the data read-write instruction.

In a possible implementation, the control module is further configured to:
  when an i-th buffer unit in the K buffer units is full, write data to an (i+m)-th buffer unit in the K buffer units, wherein i and m are integers less than K, and i+m is less than or equal to K; and
  when the (i+m)-th buffer unit is full and the i-th buffer unit is released after completion of data transmission, write data to the i-th buffer unit.

In a possible implementation, the control module is further configured to:
  when receiving a read-write completion message of the storage controller, transmit the read-write completion message to the host.

In a possible implementation, the data read-write instruction is a data read instruction configured to read data to be read from the memory, and the control module is further configured to:
  send the updated data read instruction to the storage controller;
  when receiving a write operation of the memory in response to the updated data read instruction, apply for K buffer units in the buffer module, and sequentially write the data to be read in the memory to the K buffer units; and
  when any of the K buffer units is full, directly start the data transmission of the full buffer unit, transmit the data of the full buffer unit to the host, and when the data transmission is completed, release the full buffer unit, and cancel the mapping relationship between the virtual address and the full buffer unit.

In a possible implementation, the buffer module further comprises a buffer manager for managing each buffer unit; the data read-write instruction is a data write instruction for writing data to be written to the memory; and the control module is further configured to:
  send the updated data write instruction to the storage controller and the buffer manager;
  control the buffer manager to predict a sequence of target data requests of the storage controller in response to the updated data write instructions based on a sequence of the updated data write instructions and/or a sequence of received data requests of the storage controller;
  control the buffer manager to read the data to be written from the host based on the sequence of the target data requests, apply for K buffer units, and sequentially write the data to be written in the host to the K buffer units; and
  when any of the K buffer units is full, directly start the data transmission of the full buffer unit in response to a read request of the storage controller, transmit the data of the full buffer unit to the memory for storage, and when the data transmission is completed, release the full buffer unit, and cancel the mapping relationship between the virtual address and the full buffer unit.

In a possible implementation, the control module is further configured to:

if data corresponding to the read request of the storage controller in response to the updated data write instruction is not written to the corresponding buffer unit, read the data from the host to the buffer unit by using a preset channel.

In a possible implementation, the control module is further configured to:

if a number of idle buffer units in the buffer module decreases to a preset number of idle units, directly start the data transmission of a preset number of buffer units being written, such that the number of the idle buffer units in the buffer module reaches the preset number of the idle units.

In a possible implementation, storage sizes of the respective buffer units in the buffer module are the same and are an integer multiple of a preset size.

In a possible implementation, the preset size is 4096 bytes.

According to an aspect of the present disclosure, there is provided a storage system, which comprises a host and a storage device, and the system is implemented based on the NVMe over Fabric architecture. The storage device is applied to a storage server with the architecture, and the storage device comprises a memory, a storage controller, a control module, and a buffer module, wherein the host reads and writes data in the storage device based on a data read-write instruction, the memory is configured to store data to be read and written by the host, the storage controller is configured to effect read-write control of the memory, the control module is configured to receive data read-write instructions, and the buffer module is divided into a plurality of buffer units, wherein the control module is configured to: when receiving a data read-write instruction, update the data read-write instruction by using a virtual address; apply for K buffer units in the buffer module based on the updated data read-write instruction, and perform a write operation on the K buffer units by using the data to be read and written, wherein K is less than a total number of the buffer units in the buffer module and is an integer; and when any of the K buffer units is full, directly start data transmission of the full buffer unit, and when the data transmission is completed, release the full buffer unit.

An embodiment of the present disclosure provides a storage device. The storage device is applied to a storage server based on the NVMe over Fabric architecture, and the storage device comprises a memory, a storage controller, a control module, and a buffer module, wherein the memory is configured to store data to be read and written by the host in the architecture, the storage controller is configured to effect read-write control of the memory, the control module is configured to receive data read-write instructions, and the buffer module is divided into a plurality of buffer units, wherein the control module is configured to: when receiving a data read-write instruction, update the data read-write instruction by using a virtual address; apply for K buffer units in the buffer module based on the updated data read-write instruction, and perform a write operation on the K buffer units by using the data to be read and written, wherein K is less than a total number of the buffer units in the buffer module and is an integer; and when any of the K buffer units is full, directly start data transmission of the full buffer unit, and when the data transmission is completed, release the full buffer unit.

In the embodiment of the present disclosure, by using a virtual storage address and by dividing the buffer module into a plurality of buffer units for data management by blocks, an NVMe I/O command can be updated and forwarded without applying for a storage space in advance, and transmission of data blocks can be started without checking the completion message, so the data processing procedure is optimized, and the storage time of data in the local buffer is reduced, thereby lowering the requirement for the memory of the storage server and reducing the completion latency of the NVMe I/O command.

It is appreciated that the above general description and the following detailed description are exemplary and explanatory only, and are not intended to limit the present disclosure. Other features and aspects of the present disclosure will become apparent from the following detailed description of exemplary embodiments with reference to the accompanying drawings.

BRIEF DESCRIPTION OF THE DRAWINGS

The drawings described herein are incorporated into and constitute a part of the specification, which show the embodiments in accordance with the present disclosure and which, together with the specification, serve to explain the technical solution of the present disclosure.

DETAILED DESCRIPTION

Figure 1:
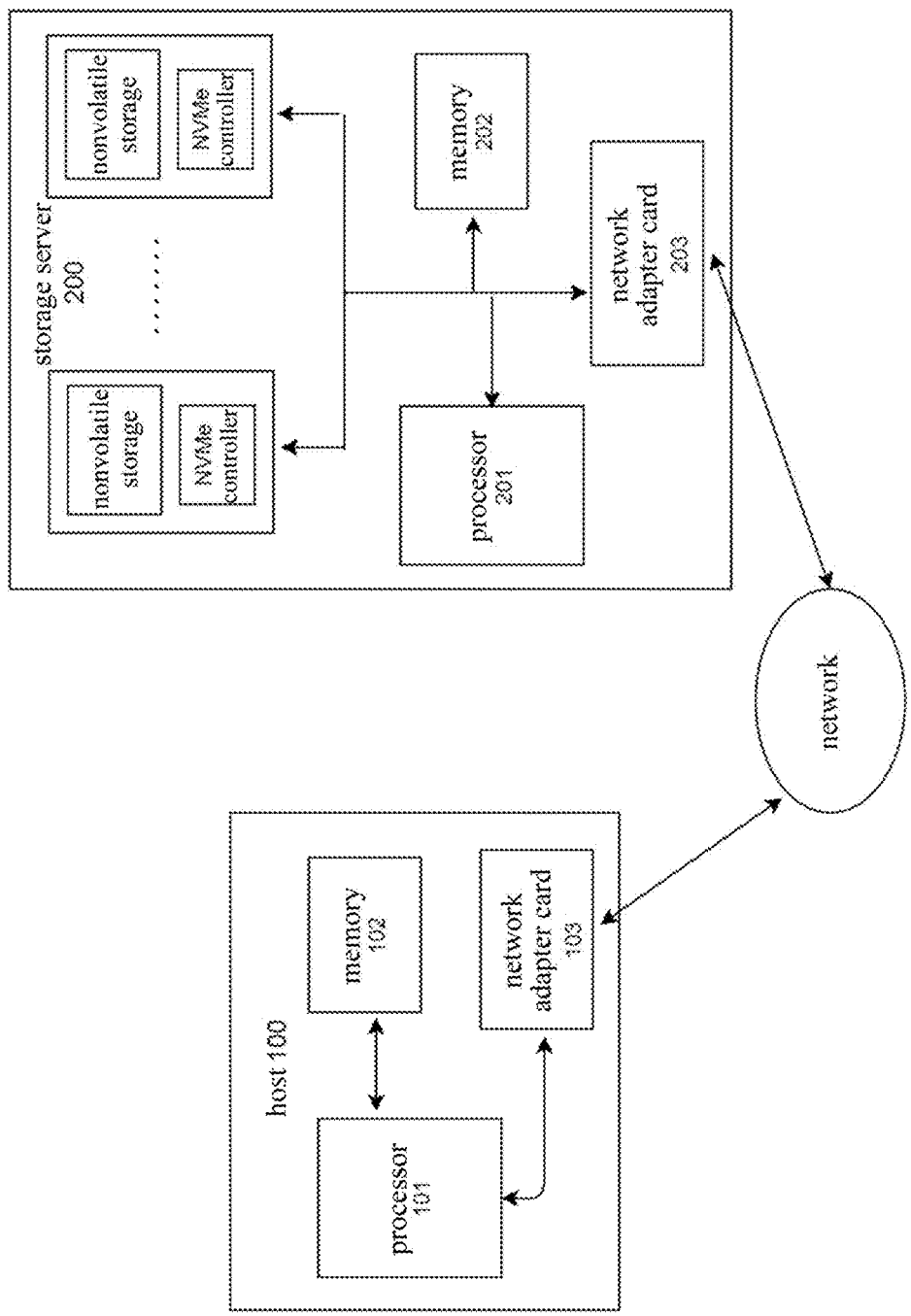
FIG. 1 shows a schematic diagram of the NVMe over Fabric architecture in a related technical solution.

Various exemplary embodiments, features and aspects of the present disclosure will be explained in detail below with reference to the accompanying drawings. In the drawings, the same reference signs denote elements with the same or similar functions. Although various aspects of the embodiments are shown in the drawings, unless otherwise specified, the drawings are not necessarily drawn to scale.

In the description of the present disclosure, it is appreciated that the directions or positional relationships indicated by the terms "length", "width", "up", "down", "front", "rear", "left", "right", "vertical", "horizontal", "top", "bottom", "in", "out", and the like are based on the drawings, and these terms are only used for convenience and simplification of the description of the present disclosure, and are not intended to indicate or imply that the referred devices or elements must have a specific orientation or must be constructed and operated in a specific orientation, and therefore they shall not be interpreted as restricting the present disclosure.

The words "first" and "second" are only used for descriptive purposes, and cannot be interpreted as indicating or implying relative importance or implicitly indicating the number of the technical feature concerned. Therefore, if a feature is defined by "first" or "second", it may explicitly indicate or implicitly indicate that there is one or more of this feature. In the description of the present disclosure, "a plurality of" means two or more, unless otherwise specified.

In the present disclosure, unless otherwise specified and defined, terms such as "mount", "connect" and "fix" should be interpreted in a broad sense. For example, the connection can be a fixed connection, a detachable connection, or an integrated connection; the connection can be a mechanical connection or an electrical connection; the connection can be a direct connection or an indirect connection through a medium; and the connection can be an internal communication between two elements or an interaction between two elements. For those of ordinary skill in the art, the specific meanings of the above terms in the present disclosure can be understood according to specific situations.

The word "exemplary" used here means "serving as an example, embodiment or illustration". Any embodiment described here as "exemplary" is not necessarily to be interpreted as superior to or better than other embodiments.

The term "and/or" used herein is only for describing an association relationship between the associated objects, which means that there may be three relationships, for example, A and/or B may denote three situations: A exists alone, both A and B exist, and B exists alone. Furthermore, the expression "at least one" used herein implies any one of a plurality of elements or any combination of at least two of a plurality of elements. For example, including at least one of A, B and C can imply that any one element or more than one element selected from a group consisting of A, B and C is included.

In addition, to better explain the present disclosure, numerous details are given in the following embodiments. It is appreciated by those skilled in the art that the present disclosure can still be implemented without some specific details. In some embodiments, methods, means, elements and circuits well known to those skilled in the art are not described in detail in order to highlight the gist of the present disclosure.

First of all, the definitions of abbreviations and key terms in the present disclosure are introduced in Table 1 below.

TABLE 1

| Abbreviation | Full Name | Chinese | Brief Introduction |
| --- | --- | --- | --- |
| I/O | Input/Output | 输入输出 | |
| NVMe | Non-Volatile Memory Express | 非易失性内存主机控制器接口规范 | |
| NVMe-oF | NVMe over Fabric | 运行于网络结构的非易失性内存主机控制器接口规范 | |
| buffer unit | buffer unit | 缓存单元 | A storage space with a fixed size is divided from a memory or other types of storage unit. |
| virtual address | virtual address | 虚拟地址 | A virtual address space is created, which does not correspond to a real address space. When data is read and written by using the virtual address, a mapping relationship between the virtual address and the buffer unit is established. |

TABLE 1-continued

| Abbreviation | Full Name | Chinese | Brief Introduction |
| --- | --- | --- | --- |
| NVMe-oF controller | NVMe over Fabric controller | | The NVMe over Fabric controller is configured to achieve the protocol conversion and data processing of NVMe over Fabric. |

Reference is made to FIG. 1, which is a schematic diagram of the NVMe over Fabric architecture in a related technical solution.

According to the related technical solution, the current Non-Volatile Memory Express (NVMe), that is, the non-volatile memory host controller interface specification, over Fabric architecture involves software architecture solutions and solutions of combination of software and hardware.

As shown in FIG. 1, a processor 101 of a host 100 sends an NVMe write I/O command to a processor 201 of a storage server 200 through a network adapter card 103, and the processor 201 receives the NVMe write I/O command, and applies for a local storage space in a memory 202 based on a data length of the I/O command. After that, the processor 201 reads the data into the local storage space in the memory 202 of the storage server 200 through a network adapter card 203. Then, the processor 201 will update a Data Pointer related field in the NVMe write I/O command, change a data address pointed to by this field from a host memory address to a local memory address, and send the updated NVMe I/O command to a target NVMe controller. The NVMe controller receives a corresponding NVMe write I/O command, reads data from the memory 202 of the storage server 200 and writes the data to a solid state disk (SSD). After the NVMe controller completes the storage of the data, a completion message is returned to a completion queue. The processor 201 of the storage server 200 then transmits the whole completion message to the processor 101 of the host 100, and the whole process of the NVMe write I/O command is completed.

For the process of a NVMe read I/O command of the host 100, the processor 101 of the host 100 sends the NVMe read I/O command to the processor 201 of the storage server 200 through the network adapter card 103. The processor 201 receives the NVMe read I/O command, and applies for a local storage space in the memory 202 based on a data length of the I/O command. Then, the processor 201 will update a Data Pointer related field in the NVMe read I/O command, change a data address pointed to by this field from a host memory address to a local memory address, and send the updated NVMe I/O command to a target NVMe controller. The NVMe controller reads corresponding data from the solid state disk and writes the data to the storage space in the memory 202 of the storage server 200. After the NVMe controller completes writing the data, it will send a completion message to the processor 201. The processor 201 of the storage server 200 transmits the data in the memory 202 to the memory 102 of the host 100 through the network adapter card 203. After the data transmission is completed, the processor 201 of the storage server 200 transmits a completion message to the processor 101 of the host computer 100, and a whole NVMe read I/O command is completed.

As shown above, in the related technical solution, in order to ensure efficient transmission performance, the storage server 200 needs a huge memory space. If the storage server 200 uses the processor 201 to complete command conversion and interrupt processing, the utilization rate of the processor 201 will be very high. Furthermore, for the NVMe write I/O command, if the storage server 200 receives the NVMe write I/O command, it needs to first apply for a storage space in the memory 202 for the data of the NVMe I/O command, read all or part of the data from the memory 102 of the host 100 into the local memory 202, and then send the updated NVMe write I/O command to the target NVMe controller. For the NVMe read I/O command, if the processor 201 of the storage server 200 receives the NVMe read I/O command, it needs to first apply for a storage space for the data of the NVMe I/O command in the local memory 202, and then send the updated NVMe read I/O command to the target NVMe controller. According to the related art, only after the NVMe controller writes all the data into the memory 202 of the storage server 200 and the storage server 200 receives the completion message of the NVMe read I/O command sent by the NVMe controller, will the data in the memory 202 be migrated to the memory 102 of the host 100. However, such an operation mode of the related art will cause that the NVMe I/O command and the data need to be temporarily stored in the memory 202 of the storage server 200 for a long time, which greatly increases the completion latency of the NVMe I/O command, and thus cannot meet the transmission requirements of applications sensitive to data latency.

According to the related art, there also exists an NVMe controller that divides a received complete NVMe I/O command into a plurality of sub-NVMe I/O commands, and transmits them to a solid state disk. However, in the related art, dividing a command may lead to atomic operations of some NVMe commands, and some additional designs are required. Furthermore, dividing an I/O command and the temporary storage of completion messages of a plurality of I/O commands both increase the complexity of design, and this solution will not reduce the operation latency of the I/O commands.

An embodiment of the present disclosure provides a storage device. The storage device is applied to a storage server based on the NVMe over Fabric architecture, and the storage device comprises a memory, a storage controller, a control module, and a buffer module, wherein the memory is configured to store data to be read and written by the host in the architecture, the storage controller is configured to effect read-write control of the memory, the control module is configured to receive data read-write instructions, and the buffer module is divided into a plurality of buffer units, wherein the control module is configured to: when receiving a data read-write instruction, update the data read-write instruction by using a virtual address; apply for K buffer units in the buffer module based on the updated data read-write instruction, and perform a write operation on the K buffer units by using the data to be read and written, wherein K is less than a total number of the buffer units in the buffer module and is an integer; and when any of the K buffer units is full, directly start data transmission of the full buffer unit, and when the data transmission is completed, release the full buffer unit.

According to an embodiment of the present disclosure, by using a virtual storage address and by dividing the buffer module into a plurality of buffer units for data management by blocks, an NVMe I/O command can be updated and forwarded without applying for a storage space in advance, and transmission of data blocks is started without checking the completion message, so the data processing procedure is optimized, and the storage time of data in the local buffer is reduced, thereby lowering the requirement for the memory of the storage server, reducing the completion latency of the NVMe I/O command and reducing the usage frequency and load of the processor.

Figure 2:
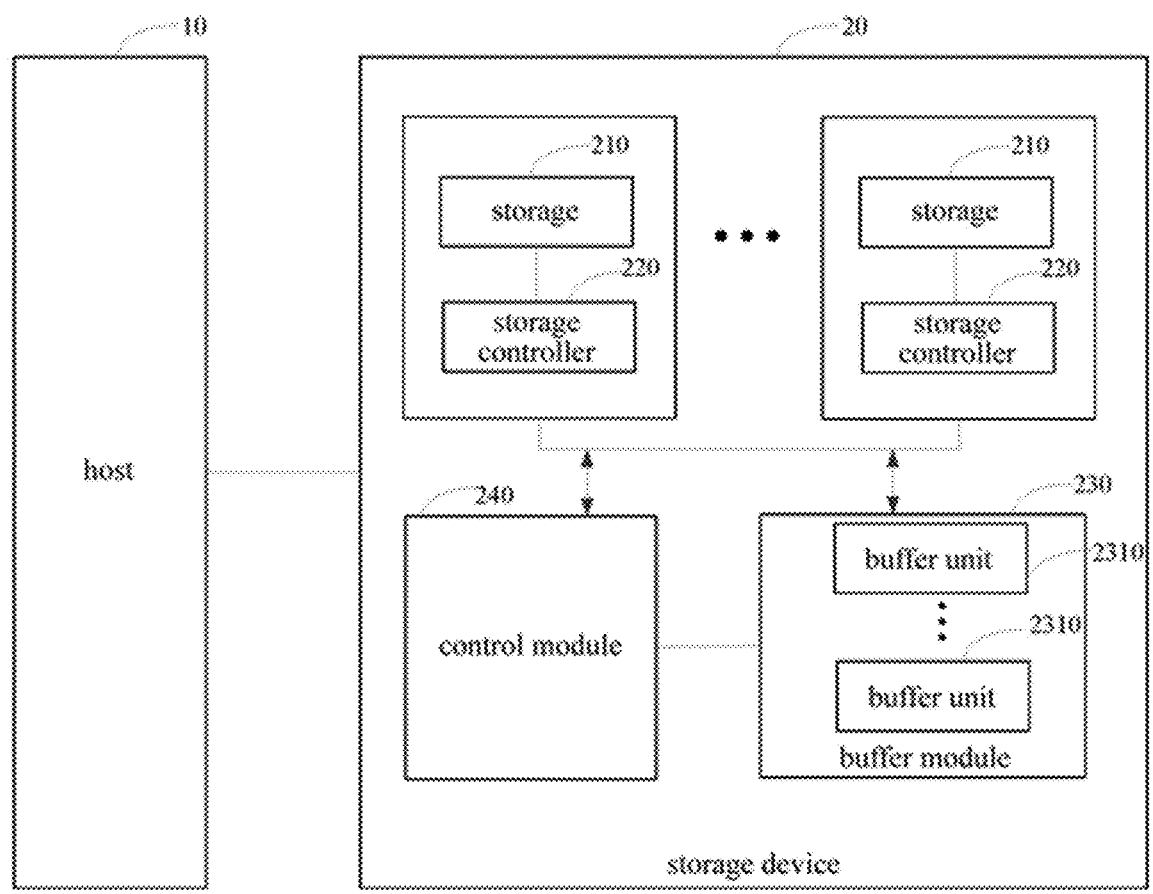
FIG. 2 shows a block diagram of a storage device according to an embodiment of the present disclosure.

FIG. 2 is a block diagram of a storage device according to an embodiment of the present disclosure.

Figure 3:
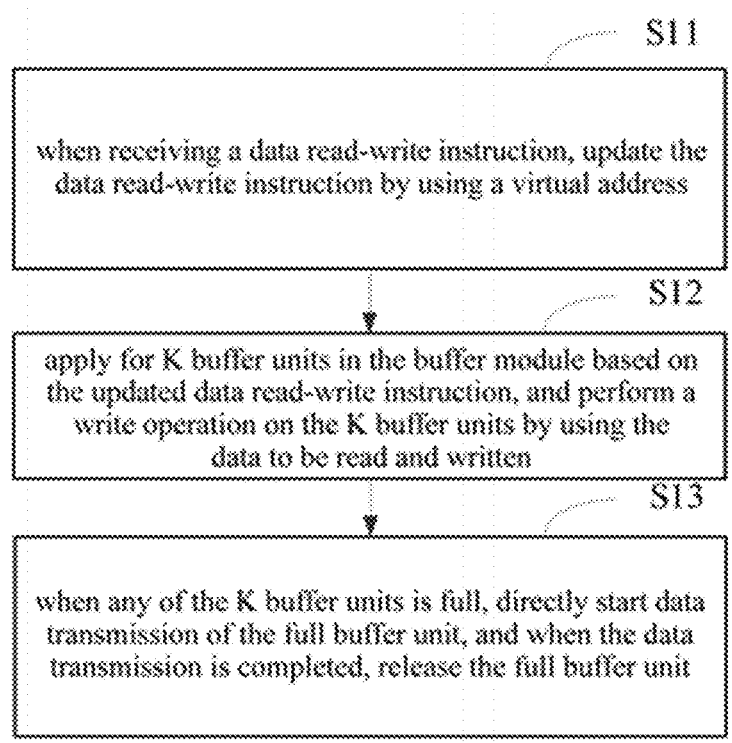
FIG. 3 shows a schematic diagram of a read-write flow of a storage device according to an embodiment of the present disclosure.

FIG. 3 is a schematic diagram of a read-write flow of a storage device according to an embodiment of the present disclosure.

The host 10 may be a terminal device, and the terminal device may be a User Equipment (UE), a mobile device, a user terminal, a terminal, a handheld device, a computing device or a vehicle-mounted device, etc. Some specific examples of the terminal device are mobile phones, tablet computers, laptop computers, palm computers, Mobile Internet Device (MID), wearable devices, Virtual Reality (VR) devices, Augmented Reality (AR) devices, wireless terminals in industrial control, wireless terminals in self-driving, wireless terminals in remote medical surgery, wireless terminals in Smart Grid, wireless terminals in transportation safety, wireless terminals in Smart City, wireless terminals in Smart Home, wireless terminals in car networking and so on.

In some possible implementations, the control module 240 may be implemented by a processing component. In one example, the processing component includes, but is not limited to, a single processor, or a discrete component, or a combination of a processor and a discrete component. The processor may include a controller with the function of executing instructions in an electronic device, and may be implemented in any suitable way, for example, by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic elements. Inside the processor, the executable instructions can be executed by hardware circuits such as logic gates, switches, ASICs, Programmable Logic Controllers (PLCs) and embedded microcontrollers.

The storage device 20 can be applied to a storage server based on the NVMe over Fabric architecture, and as shown in FIG. 2, the storage device 20 comprises a storage 210, a storage controller 220, a control module 240, and a buffer module 230, wherein the storage 210 is configured to store data to be read and written by the host 10 in the architecture, the storage controller 220 is configured to effect read-write control of the storage 210, the control module 240 is configured to receive data read-write instructions, and the buffer module 230 is divided into a plurality of buffer units 2310, wherein as shown in FIG. 3, the control module 240 is configured to:

S11: when receiving a data read-write instruction, update the data read-write instruction by using a virtual address;

S12: apply for K buffer units 2310 in the buffer module 230 based on the updated data read-write instruction, and perform a write operation on the K buffer units 2310 by using the data to be read and written, wherein K is less than a total number of the buffer units 2310 in the buffer module 230 and is an integer; and S13: when any of the K buffer units 2310 is full, directly start data transmission of the full buffer unit 2310, and when the data transmission is completed, release the full buffer unit 2310.

In a possible implementation, the storage device 20 may comprise a plurality of memories 210 and a plurality of corresponding storage controllers 220. The storage 210 may be a solid state disk or the like, and the storage controller 220 may be a storage controller 220 of the solid state disk. In the NVMe over Fabric architecture, the storage controller 220 is an NVMe controller that controls the read or write of the storage 210. The embodiment of the present disclosure does not limit the specific implementation of the storage controller 220, and those skilled in the art can implement the storage controller 2320 by using the controllers in the related art or by using the aforementioned processing component.

In a possible implementation, the data read-write instruction can be an NVMe read I/O command or an NVMe write I/O command in the NVMe over Fabric architecture.

In a possible implementation, the control module 240 is further configured to:
   establish a mapping relationship between the virtual address and the buffer unit 2310; and
   when data transmission of a full buffer unit 2310 is completed, cancel the mapping relationship between the virtual address and the full buffer unit 2310.

According to the embodiment of the present disclosure, by establishing the mapping relationship between the virtual address and the buffer units 2310, the buffer units 2310 can be obtained by mapping the virtual address, so that an efficient management of the buffer units 2310 can be achieved. Moreover, when the data transmission of the full buffer unit 2310 is completed, the mapping relationship between the virtual address and the full buffer unit 2310 can be canceled, which improves the utilization rate of the buffer units 2310 and effectively reduces the requirement for the buffer module 230. That is, the data read-write operations can be efficiently, swiftly and accurately performed with a small storage space.

In a possible implementation, the step S11, in which the data read-write instruction is updated by using a virtual address, may comprise replacing the memory address of the host 10 in the data pointer in the data read-write instruction with a virtual address.

In a possible implementation, the control module 240 is further configured to establish a mapping relationship between the virtual address and the data read-write instruction.

According to an embodiment of the present disclosure, when the control module 240 receives an NVMe I/O command, it does not divide the NVMe I/O command, so it is not necessary to apply for a local storage space for the NVMe I/O command; and for an NVMe write I/O command, it is not necessary to immediately read all the data in the memory of the host 10 into a local storage space. A virtual address is used to replace the memory address of the host 10 in a Data Pointer related field in the NVMe I/O command, for example, it can be a memory address to which the data to be read to the host 10 is to be written in the host 10, or a memory address of data to be written to the storage device 20 in the host 10, and an updated NVMe I/O command is quickly forwarded to the storage controller 220.

According to an embodiment of the present disclosure, a virtual address may be a base address that points to a virtual local storage space required for data storage in an NVMe I/O command. This storage space is virtual and does not correspond to a real (physical) local storage space. Although a virtual address does not represent a real address, it can be represented by a base address plus an offset. For example, a virtual address 1 can be represented by a base address 1+an offset, and a virtual address 2 can be represented by a base address 2+an offset, or a base address 1+2 times of an offset, that is, virtual addresses can be represented or distinguished by offset. Alternatively, virtual addresses can be represented in other ways, as long as the virtual addresses can be distinguished from each other. According to an embodiment of the present disclosure, when the NVMe controller (storage controller 220) uses a virtual address to read or write data, a physical storage space (buffer unit 2310) is applied for and a temporary mapping relationship between the virtual storage space and the physical storage space is established. In addition, the virtual address is associated with the NVMe I/O command, that is, the virtual address that replaces the memory address of the host in the NVMe I/O command is bound with the replaced NVMe I/O command, and the corresponding NVMe I/O command can be quickly queried through the virtual address. By using the virtual address, the NVMe I/O command can be quickly updated and forwarded without considering the local storage space, thus reducing the storage time of the NVMe I/O command in the NVMe over Fabric implementation framework.

According to an embodiment of the present disclosure, when the control module 240 receives a data read-write instruction, it updates the data read-write instruction through a virtual address. Different from the related art in which a data pointer in the data read-write instruction directly points to a physical storage space, the embodiment of the present disclosure can update and forward the data read-write instruction without applying for a storage space in advance, thus optimizing the data processing procedure.

In a possible implementation, the control module 240 is further configured to:
   when an i-th buffer unit 2310 in the K buffer units 2310 is full, write data to an (i+m)-th buffer unit 2310 in the K buffer units 2310, wherein i and m are integers less than K, and i+m is no more than K; and
   when the (i+m)-th buffer unit 2310 is full and the i-th buffer unit 2310 is released after completion of data transmission, write data to the i-th buffer unit 2310.

According to an embodiment of the present disclosure, when an i-th buffer unit 2310 of the K buffer units 2310 is full, an (i+m)-th buffer unit 2310 of the K buffer units 2310 is written, and when the (i+m)-th buffer unit 2310 is full and the i-th buffer unit 2310 completes data transmission and is released, the i-th buffer unit 2310 is written. By dividing the buffer module 230 into a plurality of buffer units 2310 for data management by blocks, and by starting the transmission of data blocks without checking the completion message of the whole data, the data processing procedure is optimized and the storage time of the data in the local buffer is reduced, thereby lowering the requirement for the memory of the storage server and reducing the completion latency of the NVMe I/O command.

The embodiment of the present disclosure does not limit the value of m. For example, the value of m can be 1, that is, the data is written into the respective buffer units in sequence. Undoubtedly, m can take a value other than 1 as required.

In a possible implementation, the control module 240 is further configured to:
   when receiving a read-write completion message of the storage controller 220, the read-write completion message is transmitted to the host 10.

According to an embodiment of the present disclosure, when receiving a read-write completion message from the storage controller 220, the read-write completion message is transmitted to the host 10, such that the data read-write process can be controlled, and the host 10 is notified of the completion of data transmission.

In a possible implementation, the control module 240 does not immediately apply for a storage space in the buffer module 230 when receiving an NVMe read I/O command, but replaces a memory address of the host 10 in a Data Pointer related field in the NVMe read I/O command with a virtual address, and then sends an updated NVMe read I/O command to a target NVMe controller. When the control module 240 receives that the NVMe controller writes to the virtual address, it immediately applies for a buffer unit 2310 in the buffer module 230 (local memory or other storage), establishes a mapping relationship between the virtual address and the buffer unit 2310, and writes the data into the local buffer unit 2310. That is, during the execution of the NVMe read I/O command, a mapping relationship is established between the virtual address in the command and the buffer unit 2310 that has been applied for, such that this buffer unit 2310 can be mapped based on the virtual address. Thus, data can be written into this buffer unit 2310. If a mapping relationship is not established between a virtual address in another NVMe read I/O command and this buffer unit 2310, no data will be written into this buffer unit 2310. When the buffer unit 2310 is full, the data of the buffer unit 2310 is immediately transmitted to a corresponding memory space of the host 10 without waiting for the completion message, the mapping relationship between the buffer unit 2310 and the virtual address can be canceled at the same time, and the buffer unit 2310 is immediately released. The above data relocation process is repeated until the transmission of the data of the NVMe read I/O command is completed.

In a possible implementation, when receiving an NVMe write I/O command, the control module 240 will not immediately apply for a storage space for the NVMe write I/O command, but will replace a memory address of the host 10 in a Data Pointer related field in the NVMe write I/O command with a virtual address, and then send an updated NVMe write I/O command to a target NVMe controller. After that, the hardware control module 240 is started to apply for one or more buffer units 2310 which are temporarily mapped with the virtual address, and part of the data from the memory of the host 10 is read to the local buffer units 2310. When the NVMe controller finishes reading the data of the buffer units 2310, it immediately cancels the mapping relationship between the virtual address and the buffer units 2310 and immediately releases the buffer units 2310. The above data relocation process is repeated until the transmission of the data of the NVMe write I/O command is completed.

According to an embodiment of the present disclosure, by introducing the virtual address and the data block management mechanism based on the buffer units 2310, transmission channels of the NVMe I/O command and data are implemented through hardware, and there is no need to wait until the data of the entire NVMe I/O command is moved to the local storage space before forwarding the NVMe I/O command to the target NVMe controller. By managing and rapidly transmitting the data based on the buffer units 2310, the buffer units 2310 can be efficiently utilized and released, which can significantly lower the requirements for local storage of the storage server, and also considerably reduce the completion latency of the NVMe I/O command.

In a possible implementation, buffer resources of the buffer module 230 can be divided into units in advance, such that the buffer module 230 is divided into a plurality of buffer units 2310. The embodiment of the present disclosure does not limit the mode in which the buffer resources are divided into units, and those skilled in the art can determine how to make the division according to the requirements and the actual situation. Furthermore, the buffer module 230 in an embodiment of the present disclosure may be a memory or other storage resources.

In a possible implementation, storage sizes of the respective buffer units 2310 in the buffer module 230 are the same, and are an integer multiple of a preset size.

In a possible implementation, the preset size is 4096 bytes (4 kilobytes). The preset size is set to 4 kilobytes in an embodiment of the present disclosure for improving the efficiency of data reading and writing.

In one example, the buffer module 230 can be divided into a plurality of equally sized buffer units 2310, and the size of the buffer units 2310 may be a multiple of 512 bytes, such as 1 kilobyte, 2 kilobytes, 4 kilobytes, 8 kilobytes or 16 kilobytes. It is appreciated that the selection of the size of the buffer units 2310 will affect the efficiency of data transmission. The larger the size of the buffer unit 2310 is, the lower the reuse efficiency of the buffer unit 2310 will be. The smaller the size of the buffer unit 2310 is, the higher the utilization rate of the storage space is, but the transmission will be more frequent, which will decrease the efficiency of the transmission network. Therefore, it is necessary to make a selection based on the transmission conditions of different networks.

According to an embodiment of the present application, the buffer unit 2310 divides a local storage space into a plurality of fixed small storage spaces, each of which is a buffer unit 2310. Assuming that the size of each buffer unit 2310 is 4 kilobytes, the local storage of 1 megabyte can be divided into 256 buffer units 2310. In the embodiment of the present disclosure, reading and writing of the data in the memory of the host 10 is performed based on the size of the buffer unit 2310.

According to an embodiment of the present disclosure, the buffer unit 2310 is recycled, and the release of the buffer unit 2310 does not need to wait for the completion message of the corresponding NVMe I/O command. The rapid release of the buffer unit 2310 can improve the utilization efficiency of the buffer unit 2310, thereby reducing the local storage space as well as the buffer time of data in the local storage space.

For an NVMe read I/O command, when the control module 240 detects the NVMe controller's request to write data using a virtual address, it immediately applies for a buffer unit 2310, establishes a temporary mapping relationship between the buffer unit 2310 and an address space pointed to by the virtual address, and writes the data into the buffer unit 2310 in sequence. When the control module 240 detects that the buffer unit 2310 is full, it immediately relocates the data in the buffer unit 2310 to the corresponding address space in the memory of the host 10. When the control module 240 detects a confirmation that the data of the buffer unit 2310 has been transmitted completely, it cancels the mapping relationship between the buffer unit 2310 and the address space pointed to by the virtual address, and releases the buffer unit 2310.

For an NVMe write I/O command, the control module 240 will apply for one or more buffer units 2310, establish a mapping relationship for the virtual address space of corresponding the I/O, and then read part of the data of the NVMe write I/O command into the buffer unit 2310 in advance. When the control module 240 detects the NVMe controller's request to read data using the virtual address, it directly reads the data in the corresponding buffer unit 2310. After the data in one buffer unit 2310 has been read completely, the mapping relationship between the buffer unit 2310 and the address space pointed to by the stored virtual address can be canceled, and the buffer unit 2310 is released.

Figure 4:
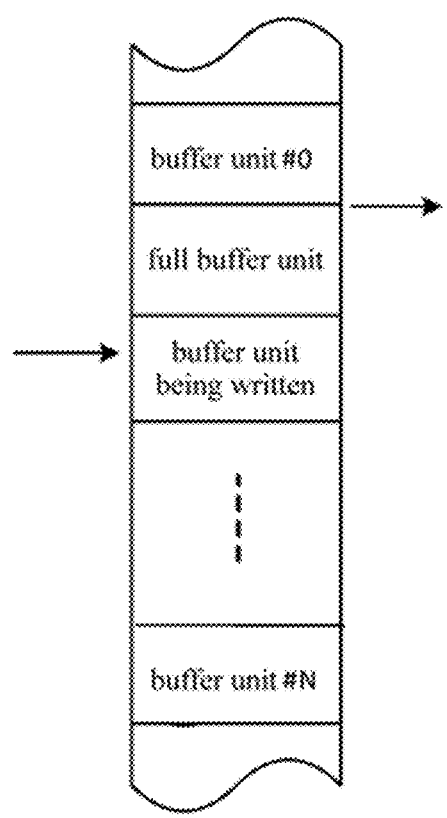
FIG. 4 shows a schematic diagram of the division of buffer units according to an embodiment of the present disclosure.

Reference is made to FIG. 4, as an example, which shows a schematic diagram of the division of the buffer units 2310 according to an embodiment of the present disclosure.

In one example, as shown in FIG. 4, the buffer resources of the buffer module 230 can be divided into N consecutive buffer units 2310, wherein the buffer units 2310 include buffer units 2310 being written to, buffer units 2310 that have been written to capacity (full), idle buffer units 2310, etc.

The data reading process and data writing process are respectively introduced in the following by way of example.

In a possible implementation, the data read-write instruction is a data read instruction, which is used to read data to be read from the storage 210, and the control module 240 may be further configured to:

send an updated data read instruction to the storage controller 220;

when receiving a write operation of the storage 210 in response to the updated data read instruction, apply for K buffer units 2310 in the buffer module 230, and sequentially write the data to be read in the storage 210 to the K buffer units 2310; and when any of the K buffer units 2310 is full, directly start data transmission of the full buffer unit 2310, transmit the data of the full buffer unit 2310 to the host 10, and release the full buffer unit 2310 when the data transmission is completed, and cancel the mapping relationship between the virtual address and the full buffer unit 2310.

With the above configuration, when a data read instruction is received, an updated data read instruction can be transmitted to the storage controller 220, and after a data write request of the storage controller 220 for using a virtual address is received, K buffer units 2310 are applied for in the buffer module 230, and data to be read in the storage 210 is sequentially written to the K buffer units 2310. When any of the K buffer units 2310 is full, data transmission of the full buffer unit 2310 is directly started, the data of the full buffer unit 2310 is transmitted to the host 10, and when the data transmission is completed, the full buffer unit 2310 is released, and the mapping relationship between the virtual address and the full buffer unit 2310 is canceled. By managing and rapidly transmitting the data to be read based on the buffer units 2310, the buffer units 2310 are efficiently utilized and released, which lowers the requirements for local storage of the storage server and also considerably reduces the completion latency of the I/O command.

In one example, K may be 1, that is, for a data read instruction, one buffer unit is applied for and is written each time, and when this buffer unit is full, another buffer unit is applied for and is written. Undoubtedly, K can also be a value other than 1. For example, K can be 2, in which case two buffer units are applied for at a time, and a first buffer unit is written first, and when the first buffer unit is full, a second buffer unit is directly written. When the second buffer unit is full and the first buffer unit is released after completing data transmission, the first buffer unit is written again. In this way, the data read operation can be completed by this cyclic working mode, which can reduce the size of the storage space and the instruction latency. Of course, it is also possible to predict the value of K based on parameters such as writing speed, reading speed, and release time of the buffer units, and apply for the buffer unit(s) based on the predicted value of K, which is not limited by the embodiments of the present disclosure.

The reading of data in the storage 210 by the host 10 will be described below with reference to examples.

Figure 5:
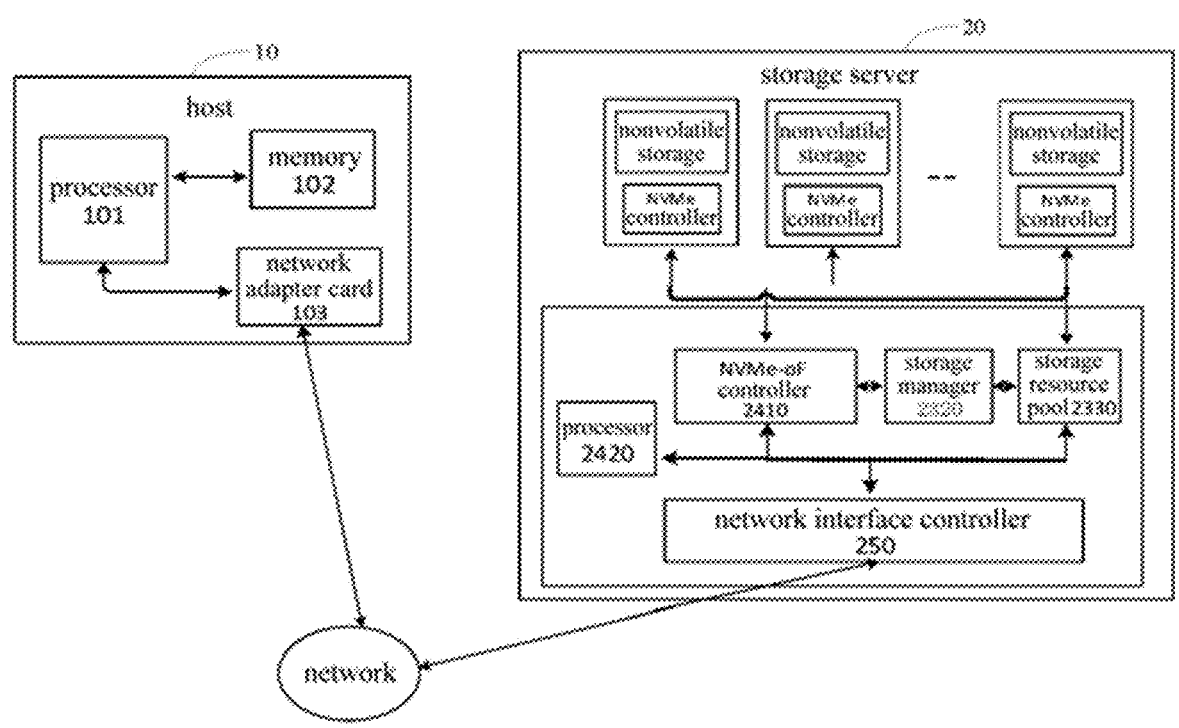
FIG. 5 shows a schematic diagram of the NVMe over Fabric architecture according to an embodiment of the present disclosure.

Reference is made to FIG. 5, which shows a schematic diagram of the NVMe over Fabric architecture according to an embodiment of the present disclosure.

In one example, as shown in FIG. 5, the host 10 may comprise a processor 101, a memory 102, and a network adapter card 103. The host 10 is connected to a storage server through a network; a storage 210 in a storage device 20 may be a nonvolatile storage 210; a storage controller 220 can be an NVMe controller; a control module 240 can comprise an NVMe-oF controller 2410 and a processor 2420; a buffer module 230 can comprise a storage manager 2320 and a storage resource pool 2330 which includes a plurality of storage resources divided into buffer units 2310; the storage manager 2320 can be configured to manage the storage resource pool 2330 and interact with the control module 240; and the storage server can communicate with the network adapter card 103 of the host 10 through a network interface controller 250.

The following exemplarily describes the steps of processing an NVMe read I/O command request with 128 kilobytes of data. In one example, the storage device 20 can process a data read instruction of the host 10 through Steps 1 to 6 below. It should be noted that if the NVMe-oF controller is implemented by hardware, the following Steps 2, 3, and 4 are performed simultaneously.

In Step 1, when the NVMe-oF controller 2410 receives an NVMe read I/O command (data read command), it does not need to apply for any buffer unit 2310 for the NVMe read I/O command, but needs to replace a memory address of the host 10 in a Data Pointer related field in the NVMe I/O with a virtual address, and send an updated NVMe read I/O command to an NVMe controller of a target solid state disk (nonvolatile storage 210).

In Step 2, when the NVMe-oF controller 2410 monitors that the NVMe controller of the solid state disk writes data (a write operation of the storage controller 220 to the buffer module 230) by using a virtual addressbuffer module, the NVMe-oF controller 2410 immediately applies to the storage resource pool 2330 for a buffer unit 2310, establishes a mapping relationship between the virtual address space of 4 kilobytes (one buffer unit 2310) and the buffer unit 2310, and writes the received data to the buffer unit 2310 in sequence.

In Step 3, when the NVMe-oF controller 2410 monitors that a local buffer unit 2310 is written full of 4 kilobytes, it immediately transmits the data of 4 kilobytes of the buffer unit 2310 to a corresponding storage space in the memory of the host 10 through the network interface controller 250, without waiting for the completion message of the NVMe I/O command corresponding to the buffer unit 2310.

In Step 4, when the NVMe-oF controller 2410 monitors that the network interface controller 250 writes the data of a buffer unit 2310 with 4 kilobytes to the host 10, it immediately cancels the mapping relationship between the virtual address space with 4 kilobytes and the buffer unit 2310, and releases the buffer unit 2310 to the storage resource pool 2330.

In Step 5, the Steps 2 to 4 are repeated to complete relocation of the rest of the data.

In Step 6, when the NVMe-oF controller 2410 receives an NVMe I/O completion message from the NVMe controller, it checks and confirms that all 128 kilobytes of data have been transmitted to the host 10, and transmits the completion message to the host 10 through the network interface controller 250, thus a complete process of an NVME read I/O command is completed.

According to an embodiment of the present disclosure, when the NVMe-oF controller 2410 receives the NVMe controller's request to write data using a virtual address, it will not apply for 32 buffer units 2310 for all 128 kilobytes of data at a time, and by way of example, it will only apply for one buffer unit 2310 (of course, the number of buffer units 2310 to be applied for can be determined as required). On the PCIe IP interface, data is transmitted byte by byte. If the virtual address is represented by an offset, the NVMe-oF controller 2410 will write data to the corresponding buffer unit 2310 depending on the offset of the virtual address of the data request. If a mapping relationship has been established between the offset of the virtual address corresponding to the data request and the buffer unit 2310, the data is directly written into a corresponding position of the buffer unit 2310. If the offset of the virtual address corresponding to the data request is a second space with a size of 4 kilobytes, which has not been mapped to any buffer unit 2310, a buffer unit 2310 is immediately applied for and a mapping relationship is established, such that the data is directly written to the buffer unit 2310.

In a possible implementation, the buffer module 230 further comprises a buffer manager 2320 which is configured to manage respective buffer units 2310. The data read-write instruction is a data write instruction which is used to write data to be written in the storage 210. The control module 240 is further configured to:

send an updated data write instruction to the storage controller 220 and the buffer manager 2320; and control the buffer manager 2320 to predict a sequence of target data requests of the storage controller 220 in response to the updated data write instructions based on a sequence of the updated data write instructions and/or a sequence of received data requests of the storage controller 220; and in one example, the prediction can be made by related technologies, and the specific prediction mode is not limited in the present disclosure;

control the buffer manager 2320 to read the data to be written from the host 10 based on the sequence of the target data requests, apply for K buffer units, and sequentially write the data to be written in the host 10 to the K buffer units 2310; and when any of the K buffer units 2310 is full, directly start the data transmission of the full buffer unit 2310 in response to a read request of the storage controller 220, transmit the data of the full buffer unit 2310 to the storage 210 for storage, and when the data transmission is completed, release the full buffer unit 2310, and cancel the mapping relationship between the virtual address and the full buffer unit 2310.

With the above configuration, when receiving a data write instruction, the control module 240 transmits an updated data write instruction to the storage controller 220 and the buffer manager, controls the buffer manager to predict a sequence of target data requests of the storage controller 220 in response to the updated data write instructions based on a sequence of the updated data write instructions and/or a sequence of received data requests of the storage controller 220, controls the buffer manager to read the data to be written from the host 10 based on the sequence of the target data requests and applies for K buffer units 2310, sequentially writes the data to be written in the host 10 to the K buffer units 2310, and when any of the K buffer units 2310 is full, directly starts the data transmission of the full buffer unit 2310 in response to a read request of the storage controller 220, transmits the data of the full buffer unit 2310 to the storage 210 for storage, and when the data transmission is completed, releases the full buffer unit 2310, and cancels the mapping relationship between the virtual address and the full buffer unit 2310. In this way, by managing and rapidly transmitting the data to be written based on the buffer units 2310, the buffer units 2310 are efficiently utilized and released, which lowers the requirement for local storage in the storage server and considerably reduces the completion latency of the I/O instruction.

The following exemplarily describes the steps of processing an NVMe write I/O command request with 128 kilobytes of data. In one example, the storage device 20 can process a data write instruction of the host 10 through the following Steps a to e. If the NVMe-oF controller is implemented by hardware, the following Steps b, c and d can be performed simultaneously.

In Step a, when the NVMe-oF controller 2410 receives an NVMe write I/O command, it does not need to apply for any buffer unit 2310 for the NVMe write I/O command or immediately read the data in the memory of the host 10, but needs to replace the memory address of the host 10 in a Data Pointer related field in the NVMe I/O with a virtual address, transmit an updated NVMe write I/O command to a target NVMe controller, and transmit the information of the NVMe write I/O to the storage manager 2320.

In Step b, the NVMe-oF controller 2410 controls the buffer manager 2320 to predict a sequence of data requests of the NVMe controller based on a sequence of forwarded NVMe write I/O commands and a sequence of received data requests of the NVMe controller, and read part of the data in the memory of the host 10. The embodiments of the present disclosure do not limit the specific mode of predicting the sequence of data requests of the NVMe controller, and those skilled in the art can make the prediction based on the related art. The storage manager 2320 will sequentially apply for a buffer unit 2310 in the storage resource pool 2330 for the data involved in the data requests based on the predicted sequence of data requests, establish a mapping relationship between the buffer unit 2310 and a virtual address space with a size of 4 kilobytes corresponding to the NVMe write I/O command, and start reading the corresponding 4 kilobytes of data from the memory of the host 10 to the buffer unit 2310 in advance. In order to avoid the situation that the NVMe controller's data request has to wait to read the data in the memory of the host 10, according to an embodiment of the present disclosure, the storage manager 2320 can sequentially and successively apply for a plurality of buffer units 2310 and read a plurality of corresponding data of 4 kilobytes from the memory of the host 10 in advance.

In Step c, when the NVMe-oF controller 2410 monitors that the NVMe controller has finished reading the data of a buffer unit 2310, the NVMe-oF controller 2410 will release the buffer unit 2310 and establish the mapping relationship between the buffer unit 2310 and the virtual address space with a size of 4 kilobytes corresponding to the NVMe write I/O command, and immediately release the buffer unit 2310. The storage manager 2320 will recycle the buffer unit 2310.

In Step d, Steps b, c and d are repeated to complete relocation of the rest of the data until the NVMe controller reads all 128 kilobytes of data of the NVMe I/O command.

In Step e, after receiving an I/O completion message from the NVMe controller, the NVMe-oF controller 2410 directly transmits the completion message to the host 10 through the network interface controller 250, thus a complete process of an NVMe write I/O command is completed.

According to an embodiment of the present disclosure, during relocation of the data of the NVMe write I/O command, the storage manager 2320 does not apply for 32 buffer units 2310 to store 128 kilobytes of data at a time, which can save the use of the buffer units 2310. On the contrary, the method of directly applying for a storage space of 128 kilobytes in the related art obviously wastes a plurality of buffer units 2310. The storage manager 2320 applies for several buffer units 2310 in sequence, and reads the corresponding data from the memory of the host 10 into the buffer units 2310. After the NVMe controller starts reading the data of the NVMe I/O and releases one buffer unit 2310, the storage manager 2320 applies for another buffer unit 2310, and starts reading the next data of 4 kilobytes. By way of example, the storage manager 2320 only needs to ensure that reading data by the NVMe controller and reading data from the memory of the host 10 are approximately balanced. When the NVMe controller needs to read data, the storage manager 2320 has already read the data from the memory of the host 10 to the buffer unit 2310.

According to an embodiment of the present disclosure, the NVMe I/O command does not need to wait for the application for a storage space, and the data does not need to wait for the completion message of the NVMe I/O command, which will obviously reduce the storage time of the NVMe I/O command and the data in the buffer modules 230. Moreover, relocation of the data in the memory of the host 10 is completed based on the size of the buffer units 2310, which can obviously save the local storage resources.

In order to complete the transmission of NVMe I/O commands and data more efficiently, the control module 240 (taking the NVMe-oF controller 2410 as an example) needs to take into consideration some abnormal read or write situations, and also needs to prepare a handling mechanism for some special situations.

In a possible implementation, the control module 240 is further configured to:

if the data corresponding to the read request of the storage controller 220 in response to the updated data write instruction is not written to the corresponding buffer unit 2310, read the data from the host 10 to the buffer unit 2310 by using a preset channel.

By way of example, for an NVMe write I/O command request of the host 10, the NVMe-oF controller 2410 needs to adjust the number of data read by different channels in the memory of the host 10 in real time based on the resources of the local buffer units 2310 and the data requests of the NVMe controller, so as to achieve an accuracy rate of the data requests of the NVMe controller as high as possible. As the data read requests of the NVMe controller go through a PCIe switching structure, there will be disorder and the data requests may come from different NVMe controllers. Moreover, the NVMe-oF controller 2410 only reads part of the data in advance. When the NVMe-oF controller 2410 finds that the data in the memory has not been read to the local buffer unit 2310, the NVMe-oF controller 2410 can activate dedicated emergency channel resources to read the required data from the memory of host 10 to the corresponding buffer unit 2310. The emergency channel resources can be, for example, communication resources of any available network card, and the emergency channel resources can be configured in advance. The specific configuration of the emergency channel resources is not limited by the embodiments of the present disclosure.

In a possible implementation, the control module 240 may be further configured to:

if a number of idle buffer units 2310 in the buffer module 230 decreases to a preset number of idle units, directly start the data transmission of the preset number of buffer units being written, such that the number of the idle buffer units 2310 in the buffer module 230 reaches the preset number of the idle units.

By way of example, for an NVMe read I/O command request of the host 10, the NVMe-oF controller 2410 needs to adjust the number of I/O commands forwarded to different target NVMe controllers in real time based on the resources of the local buffer unit 2310, the data writing of the NVMe controller and the processing speed of the network interface control 250. Because the data writing by the NVMe controller goes through a PCIe switch structure, there will be disorder and even multiple retransmissions. In order to cope with extreme cases, the NVMe-oF controller 2410 needs to ensure enough idle buffer units 2310. When the number of the idle buffer units 2310 reaches a certain threshold, even if some buffer units 2310 are not full, it is necessary to activate the emergency channel resources and write the data of the buffer units 2310 into the corresponding address space in the memory of the host 10, thus ensuring the number of the idle buffer units 2310.

The embodiments of the present disclosure do not limit the specific preset number of the idle units, and those skilled in the art can set the number according to the requirements and the actual conditions.

According to an embodiment of the present disclosure, the required storage is divided into two types. One type of the required storage is to record and store some information of NVMe I/O command conversion (such as SGL, Command ID and buffer unit 2310 index, etc.). The ability of storing the NVMe I/O command information will affect the number of forwarded NVMe I/O commands and further affect the overall I/O throughput performance, but this ability does not occupy much storage space. The other type of the required storage is the buffer unit 2310 for storing data, which is configured to buffer the data of NVMe I/O commands. The size of this type of storage space can be determined based on the data transmission latency of the network interface controller. In order to ensure the transmission performance of I/O commands, different network transmission protocols have their own optimal storage space sizes. In the embodiment of the present disclosure, due to the division and the efficient management of the buffer units 2310, the size of the local storage space will be greatly reduced. For calculation of the storage space for local data storage, assuming that 2048 NVMe I/O commands can be processed at the same time, the maximum transmission length of each NVMe I/O command is 512K bytes. In the current mainstream technology, 1 gigabyte of storage space will be needed. In the embodiment of the present disclosure, due to the use of the virtual address and the efficient management of the buffer units 2310, the used storage space will be far less than 1 gigabyte. Assuming that RDMA transmission over Ethernet is used, the required storage space is about 8 megabytes.

According to an embodiment of the present disclosure, the data transmission channel of NVMe over Fabric is implemented by hardware, and by introducing the virtual storage address and the data block management, the NVMe I/O command can be updated and forwarded without applying for a storage space in advance. In addition, by block transmission without checking the completion message, the data processing procedure is optimized and the storage time of data in the buffer is reduced, which in turn reduces the completion latency of the NVMe I/O command and which can better meet the strict requirements on transmission latency. In addition, the embodiment of the present disclosure makes efficient use of the storage space for transmission of data of the NVMe I/O command, and also lowers the server's requirement for storage. If the storage inside the chip is used in the implementation, the design complexity of the printed circuit board can be further simplified.

According to an aspect of the present disclosure, there is provided a storage system. As shown in FIG. 2, the system comprises a host 10 and a storage device 20. The system is implemented based on the NVMe over Fabric architecture, and the storage device is applied to a storage server of the architecture. The storage device 20 comprises a storage 210, a storage controller 220, a control module 240, and a buffer module 230. The host 10 reads and writes data in the storage device 20 based on data read-write instructions, the storage 210 is configured to store data to be read and written by the host 10, the storage controller 220 is configured to effect read-write control of the storage 210, the control module 240 is configured to receive data read-write instructions, and the buffer module 230 is divided into a plurality of buffer units 2310, wherein the control module 240 is configured to:

when receiving a data read-write instruction, update the data read-write instruction by using a virtual address; apply for K buffer units 2310 in the buffer module 230 based on the updated data read-write instruction, and perform a write operation on the K buffer units 2310 by using the data to be read and written, wherein K is less than a total number of the buffer units 2310 in the buffer module 230 and is an integer; and when any of the K buffer units 2310 is full, directly start data transmission of the full buffer unit 2310, and when the data transmission is completed, release the full buffer unit 2310.

It should be noted that the storage device in the storage system is the aforementioned storage device 20.

In the embodiment of the present disclosure, by using a virtual storage address and by dividing the buffer module into a plurality of buffer units 2310 for data management by blocks, an NVMe I/O command can be updated and forwarded without applying for a storage space in advance, and transmission of data blocks can be started without checking the completion message, so the data processing procedure is optimized, and the storage time of data in the local buffer is reduced, thereby lowering the requirement for the memory of the storage server and reducing the completion latency of the NVMe I/O command.

In a possible implementation, the control module 240 is further configured to:

establish a mapping relationship between the virtual address and the buffer units 2310; and when data transmission of a full buffer unit 2310 is completed, cancel the mapping relationship between the virtual address and the full buffer unit 2310.

In a possible implementation, the updating of the data read-write instruction by using the virtual address comprises: replacing the memory address of the host 10 in a data pointer in the data read-write instruction with the virtual address; and the control module 240 is further configured to establish a mapping relationship between the virtual address and the data read-write instruction.

In a possible implementation, the control module 240 is further configured to:

when an i-th buffer unit 2310 in the K buffer units 2310 is full, write data to an (i+m)-th buffer unit 2310 in the K buffer units 2310, wherein i and m are integers less than K, and i+m is no greater than K; and when the (i+m)-th buffer unit 2310 is full and the i-th buffer unit 2310 is released after completion of data transmission, write data to the i-th buffer unit 2310.

In a possible implementation, the control module 240 is further configured to:

when receiving a read-write completion message of the storage controller 220, transmit the read-write completion message to the host 10.

In a possible implementation, the data read-write instruction is a data read instruction, which is configured to read data to be read from the storage 210, and the control module 240 is further configured to:

transmit the updated data read instruction to the storage controller 220;

when receiving a write operation of the storage 210 in response to the updated data read instruction, apply for K buffer units 2310 in the buffer module 230, and sequentially write the data to be read in the storage 210 to the K buffer units 2310; and when any of the K buffer units 2310 is full, directly start the data transmission of the full buffer unit 2310, transmit the data of the full buffer unit 2310 to the host 10, and when the data transmission is completed, release the full buffer unit 2310, and cancel the mapping relationship between the virtual address and the full buffer unit 2310.

In a possible implementation, the buffer module 230 further comprises a buffer manager for managing each buffer unit 2310; the data read-write instruction is a data write instruction for writing data to be written to the storage 210; and the control module 240 is further configured to:

transmit the updated data write instruction to the storage controller 220 and the buffer manager;

control the buffer manager to predict a sequence of target data requests of the storage controller 220 in response to the updated data write instructions based on a sequence of the updated data write instructions and/or a sequence of received data requests of the storage controller 220;

control the buffer manager to read the data to be written from the host 10 based on the sequence of the target data requests, apply for K buffer units 2310, and sequentially write the data to be written in the host 10 to the K buffer units 2310; and when any of the K buffer units 2310 is full, directly start the data transmission of the full buffer unit 2310 in response to a read request of the storage controller 220, transmit the data of the full buffer unit 2310 to the storage 210 for storage, and when the data transmission is completed, release the full buffer unit 2310, and cancel the mapping relationship between the virtual address and the full buffer unit 2310.

In a possible implementation, the control module 240 is further configured to:

if data corresponding to the read request of the storage controller 220 in response to the updated data write instruction is not written to the corresponding buffer unit 2310, read the data from the host 10 to the buffer unit 2310 by using a preset channel.

In a possible implementation, the control module 240 is further configured to:

if a number of idle buffer units 2310 in the buffer module 230 is reduced to a preset number of idle units, directly start the data transmission of the preset number of buffer units being written, such that the number of the idle buffer units 2310 in the buffer module 230 reaches the preset number of the idle units.

In a possible implementation, storage sizes of the respective buffer units 2310 in the buffer module 230 are the same and are an integer multiple of a preset size.

In a possible implementation, the preset size is 4096 bytes.

It should be noted that the storage device in the system corresponds to the aforementioned storage device. The above description of the storage device can be referred to for specific description thereof, which will not be repeated herein.

In various aspects of the embodiment of the present disclosure, the local storage space is divided and managed in advance. The storage space is divided into buffer units 2310 with the same size based on the preset size of the data block. The buffer units 2310 are independent of each other and can be used and released independently.

In various aspects of the embodiment of the present application, when the NVMe over Fabric controller receives an NVMe I/O command, it does not need to apply for a local storage space immediately. After replacing the memory address of the host 10 in a Data Pointer related field in the NVMe I/O command with a virtual address, the NVMe over Fabric controller can forward the updated NVMe I/O command to the NVMe controller of the target solid state disk.

In various aspects of the embodiment of the present disclosure, when the NVMe over Fabric controller receives a data write request for using a virtual address from the NVMe controller, it applies for a buffer unit 2310 in the local storage space, establishes a temporary mapping relationship between the buffer unit 2310 and the virtual address, and writes data into the buffer unit 2310.

In various aspects of the embodiment of the present disclosure, when the NVMe over Fabric controller detects that a buffer unit 2310 is full, it immediately starts data transmission of the buffer unit 2310 without checking the completion message of the NVMe I/O command. When the NVMe over Fabric controller detects completion of transmission of the data in the buffer unit 2310, it cancels the mapping relationship between the virtual address and the buffer unit 2310 and immediately releases the buffer unit 2310. Other NVMe I/O commands or other data blocks of the NVMe I/O can recycle the released buffer unit 2310.

In various aspects of the embodiment of the present disclosure, when reading data from the memory of the host 10 in advance, the NVMe over Fabric controller can apply for the required number of buffer units 2310 in the local storage space according to the size of the pre-read data, and establish a mapping relationship between the buffer units 2310 and the virtual address of the NVMe I/O command.

In various aspects of the embodiment of the present disclosure, when detecting that the data in a buffer unit 2310 has been completely read by the NVMe controller, the NVMe over Fabric controller immediately cancels the mapping relationship between the virtual address of the NVMe I/O command and the buffer unit 2310, and releases the buffer unit 2310.

In various aspects of the embodiment of the present disclosure, the flowcharts and block diagrams in the drawings illustrate the architecture, function, and operation that may be implemented by the system, method and computer program product according to the various embodiments of the present disclosure. In this regard, each block in the flowchart or block diagram may represent a part of a module, a program segment, or a portion of code, which comprises one or more executable instructions for implementing the specified logical function(s). In some alternative implementations, the functions denoted in the blocks may occur in an order different from that denoted in the drawings. For example, two contiguous blocks may, in fact, be executed substantially concurrently, or sometimes they may be executed in a reverse order, depending upon the functions involved. It will also be noted that each block in the block diagram and/or flowchart, and combinations of blocks in the block diagram and/or flowchart, can be implemented by dedicated hardware-based systems performing the specified functions or acts, or by combinations of dedicated hardware and computer instructions Although the embodiments of the present disclosure have been described above, it will be appreciated that the above descriptions are merely exemplary, but not exhaustive; and that the disclosed embodiments are not limiting. A number of variations and modifications may occur to one skilled in the art without departing from the scopes and spirits of the described embodiments. The terms in the present disclosure are selected to provide the best explanation on the principles and practical applications of the embodiments and the technical improvements to the arts on market, or to make the embodiments described herein understandable to one skilled in the art.

The invention claimed is:

1. A storage device applied to a storage server based on an NVMe over Fabric architecture, comprising a storage, a storage controller, a control module, and a buffer module, the storage being configured to store data to be read or written by a host in the architecture, the storage controller being configured to effect read-write control of the storage, the control module being configured to receive data read-write instructions, and the buffer module being divided into a plurality of buffer units, wherein the control module is configured to:
  responsive to receiving a data read-write instruction, update the data read-write instruction with a virtual address;
  apply for K buffer units in the buffer module based on the updated data read-write instruction, and perform a write operation on the K buffer units with the data to be read or written, wherein K is less than a total number of the buffer units in the buffer module and is an integer; and
  responsive to any of the K buffer units being full, directly start data transmission of the full buffer unit, and responsive to the data transmission being completed, release the full buffer unit.

2. The device according to claim 1, wherein the control module is further configured to:
  establish a mapping relationship between the virtual address and the buffer units; and
  responsive to the data transmission of the full buffer unit being completed, cancel the mapping relationship between the virtual address and the full buffer unit.

3. The device according to claim 1, wherein updating the data read-write instruction by using the virtual address comprises: replacing a memory address of the host in a data pointer in the data read-write instruction with the virtual address; and
  the control module is further configured to establish a mapping relationship between the virtual address and the data read-write instruction.

4. The device according to claim 1, wherein the control module is further configured to:
  responsive to an i-th buffer unit in the K buffer units being full, write data to an (i+m)-th buffer unit in the K buffer units, wherein i and m are integers less than K, and i+m is less than or equal to K; and
  responsive to the (i+m)-th buffer unit being full and the i-th buffer unit being released after completion of data transmission, write data to the i-th buffer unit.

5. The device according to claim 1, wherein the control module is further configured to:
  responsive to receiving a read-write completion message of the storage controller, transmit the read-write completion message to the host.

6. The device according to claim 1, wherein the data read-write instruction is a data read instruction configured to read data to be read from the storage, and the control module is further configured to:
  send the updated data read instruction to the storage controller;
  responsive to receiving a write operation of the storage in response to the updated data read instruction, apply for K buffer units in the buffer module, and sequentially write the data to be read in the storage to the K buffer units; and
  responsive to any of the K buffer units being full, directly start the data transmission of the full buffer unit and transmit the data of the full buffer unit to the host, and responsive to the data transmission being completed, release the full buffer unit and cancel a mapping relationship between the virtual address and the full buffer unit.

7. The device according to claim 1, wherein the buffer module further comprises a buffer manager for managing each buffer unit; the data read-write instruction is a data write instruction for writing data to be written to the storage; and the control module is further configured to:
  send the updated data write instruction to the storage controller and the buffer manager;
  control the buffer manager to predict a sequence of target data requests of the storage controller in response to updated data write instructions, based on a sequence of the updated data write instructions and/or a sequence of received data requests of the storage controller;
  control the buffer manager to read the data to be written from the host based on the sequence of the target data requests, apply for K buffer units, and sequentially write the data to be written in the host to the K buffer units; and
  responsive to any of the K buffer units being full, directly start the data transmission of the full buffer unit in response to a read request of the storage controller and transmit the data of the full buffer unit to the storage for storage, and responsive to the data transmission being completed, release the full buffer unit and cancel a mapping relationship between the virtual address and the full buffer unit.

8. The device according to claim 1, wherein the control module is further configured to:
  responsive to data not written to a corresponding buffer unit, read the data from the host to the buffer unit with a preset channel, the data corresponding to a read request of the storage controller in response to the updated data read-write instruction.

9. The device according to claim 1, wherein the control module is further configured to:
  in response to a number of idle buffer units in the buffer module decreased to a preset number of idle units, directly start data transmission of a preset number of buffer units being written, whereby the number of the idle buffer units in the buffer module is limited by the preset number of the idle units.

10. The device according to claim 1, wherein sizes of the respective buffer units in the buffer module are the same and are an integer multiple of a preset size.

11. The device according to claim 10, wherein the preset size is 4096 bytes.

12. A storage system, comprising a host and a storage device,
  the storage device being applied to a storage server based on an NVMe over Fabric architecture, comprising a storage, a storage controller, a control module, and a buffer module, the storage being configured to store data to be read or written by a host in the architecture, the storage controller being configured to effect read-write control of the storage, the control module being configured to receive data read-write instructions, and the buffer module being divided into a plurality of buffer units, wherein the control module is configured to:
  responsive to receiving a data read-write instruction, update the data read-write instruction with a virtual address;
  apply for K buffer units in the buffer module based on the updated data read-write instruction, and perform a write operation on the K buffer units with the data to be read or written, wherein K is less than a total number of the buffer units in the buffer module and is an integer; and
  responsive to any of the K buffer units being full, directly start data transmission of the full buffer unit, and responsive to the data transmission being completed, release the full buffer unit;
  wherein the system is implemented based on the NVMe over Fabric architecture, and the host is configured to read or write data in the storage device based on the data read-write instruction.

* * * * *